(12) United States Patent
Umemura et al.

(10) Patent No.: US 6,941,836 B2
(45) Date of Patent: Sep. 13, 2005

(54) STEERING WHEEL

(75) Inventors: Norio Umemura, Aichi-ken (JP); Koji Sakurai, Aichi-ken (JP); Motoi Isomura, Aichi-ken (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 63 days.

(21) Appl. No.: 10/648,292

(22) Filed: Aug. 27, 2003

(65) Prior Publication Data

US 2004/0083849 A1 May 6, 2004

(30) Foreign Application Priority Data

Sep. 4, 2002 (JP) .......................... 2002-259138

(51) Int. Cl.⁷ .......................... B62D 1/04; B60R 21/16; H01N 9/00
(52) U.S. Cl. ...................... 74/552; 280/731; 280/728.2; 200/61.54
(58) Field of Search ........................... 74/552; 280/777, 280/728.2, 731; 200/61.54, 61.55, 86 R (56) References Cited

U.S. PATENT DOCUMENTS

| | | | | |
|---|---|---|---|---|
| 5,868,041 A | * | 2/1999 | Suzuki | .......................... 74/552 |
| 5,871,234 A | * | 2/1999 | Umemura et al. | .......... 280/777 |
| 6,079,737 A | * | 6/2000 | Isomura et al. | ............. 280/731 |
| 6,739,213 B2 | * | 5/2004 | Sonobe et al. | ................. 74/552 |
| 2003/0075004 A1 | * | 4/2003 | Kerner et al. | ................. 74/552 |

FOREIGN PATENT DOCUMENTS

| | | | | |
|---|---|---|---|---|
| JP | 6-144242 | * | 5/1994 | .................. 74/552 |
| JP | A-2001-277983 | | 10/2001 | |

* cited by examiner

*Primary Examiner*—Vinh T. Luong
(74) *Attorney, Agent, or Firm*—Posz Law Group, PLC (57) ABSTRACT

Upon self-alignment of a steering wheel, a steering wheel body has its ring plane displaced toward the vertical plane by plastic deformation of the steering wheel core. There is located a switch operation portion in at least one of the two front spokes neighboring a front space inside the ring portion and generally symmetrically arranged relative to the boss portion. The cores of the front spokes are further provided at positions generally symmetric relative to the boss portion and to the boss portion relative to the switch operation portion with deformable portions, respectively, to be twist-deformable upon self-alignment.

4 Claims, 12 Drawing Sheets

STEERING WHEEL

The present application claims priority from Japanese Patent Application of Umemura et al., filed Sep. 4, 2002, under No. 2002-259138, its entirety is hereby incorporated into the present application by this reference.

BACKGROUND OF THE INVENTION

1. Field of the Invention

The present invention relates to a vehicle steering wheel capable of displacing a ring plane toward the vertical plane by deforming a steering wheel core plastically upon self-alignment of the steering wheel. Here, self-alignment is a behavior of a steering wheel which deforms a steering wheel core plastically such that the top surface of a ring portion may be proximate to the vertical plane when an impact forward and generally in horizontal direction is applied to the rear part of the ring portion of the steering wheel as mounted on a vehicle. By this behavior, the ring plane hits the driver flatly, thereby the impact against the driver is relieved.

2. Description of Related Art

In the prior art, Japanese Patent Laid-Open No. 2001-277983 discloses a steering wheel which plastically deforms a steering wheel core upon self-alignment.

On the other hand, there is a recent demand of providing a switch operation portion for an audio system, a gear changer, and soon, on the steering wheel. This switch operation portion is to be located, for example, in a position on the front spoke portion of the steering wheel and close to the ring portion.

However, if a core of the steering wheel with a switch operation portion is plastically deformed upon self-alignment, the switch operation portion is likely to protrude from the displaced ring plane.

SUMMARY OF THE INVENTION

It is an object of the present invention to provide a steering wheel capable of making the switch operation portion located on the front spoke portion follow the displacement of the ring plane smoothly.

The object of the present invention is achieved by a steering wheel configured as follows:

The steering wheel comprises a steering wheel body and a switch operation portion;

the steering wheel body comprises a steering wheel core including a ring core of a ring portion, a boss core of a boss portion, and a plurality of spoke cores of spokes, the ring portion being held in steering, the boss portion being located in the center of the ring portion, the spokes connecting the ring portion and the boss portion;

upon self-alignment of the steering wheel, the steering wheel body has the ring plane thereof displaced toward the vertical plane by means of plastic deformation of the steering wheel core;

the steering wheel further comprises a switch operation portion in at least one of the two spokes located in the front side, the two front spokes neighboring a front space inside the ring portion and being arranged generally symmetrically relative to the boss portion; and cores of the front spokes comprise deformable portions, respectively, at positions generally symmetric relative to the boss portion and to the boss portion relative to the switch operation portion, whereby the front spoke cores are twist-deformable upon self-alignment.

In the steering wheel of the present invention, the deformable portions located in the front spoke cores are twist-deformed upon self-alignment of the steering wheel. At this time, an impact forward and along the generally horizontal direction is applied to the rear part of the ring portion. In the steering wheel of the present invention, although the front spokes are provided with the switch operation portion, the deformable portions are located to the boss portion relative to the switch operation portion. Accordingly, even if the deformable portions are twist-deformed upon self-alignment, the switch operation portion is displaced following the displacement of the ring plane, since the switch operation portion is located toward the ring portion.

In the steering wheel of the present invention, therefore, the switch operation portion located in the spoke is able to follow the displacement of the ring plane easily upon self-alignment. Moreover, the switch operation portion is prevented to the utmost from unnecessarily protruding from the ring plane, and applying partial pressure to the driver hitting the ring plane.

In the above steering wheel, it is desired that each of the front spoke cores further includes a second deformable portion which is twist-deformable upon self-alignment, at a position to the ring portion relative to the above mentioned deformable portion.

With this configuration, each of the front spoke cores includes two deformable portions, so that the displacement of the ring plane is promoted. By the second deformable portions, moreover, flexural strength of the deformable portions toward the boss portion (as will be called the first deformable portion, hereinafter) is improved while retaining the easiness of the displacement of the ring plane. Accordingly, deflection of the ring portion is suppressed. Consequently, natural frequency of the steering wheel itself is prevented from falling, thereby preventing chattering.

Moreover, in the above steering wheel, it is desired that the switch operation portion is screw-fixed to the front spoke core at only one position.

With this configuration, since the switch operation portion is not fixed at a plurality of positions, the switch operation portion is smoothly displaced upon self-alignment without damage along with the displacement of the ring plane. Here, if the switch operation portion is screw-fixed at a plurality of positions, the distances between the fixing points change along with the twist-deformation of the front spoke cores, which is likely to damage the switch operation portion.

Furthermore, in the above steering wheel, it is desired that:

a pad disposed over the boss portion is joined to a core of a rear spoke, which is located rearward of the front spokes, and is held there at; and the rear spoke core includes a portion plastically deformable upon self-alignment, at a position forward of the joint with the pad.

With this configuration, the pad is displaced along with the plastic deformation of the rear spoke core upon self-alignment. Accordingly, the top surface of the pad is displaced along with the ring plane while prevented from protruding from the ring plane.

DESCRIPTION OF PREFERRED EMBODIMENT

A preferred embodiment of the present invention is described below with reference to the accompanying drawings. However, the invention is not limited to the embodiment disclosed herein. All modifications within the appended claims and equivalents relative thereto are intended to be encompassed in the scope of the claims.

Figure 1:
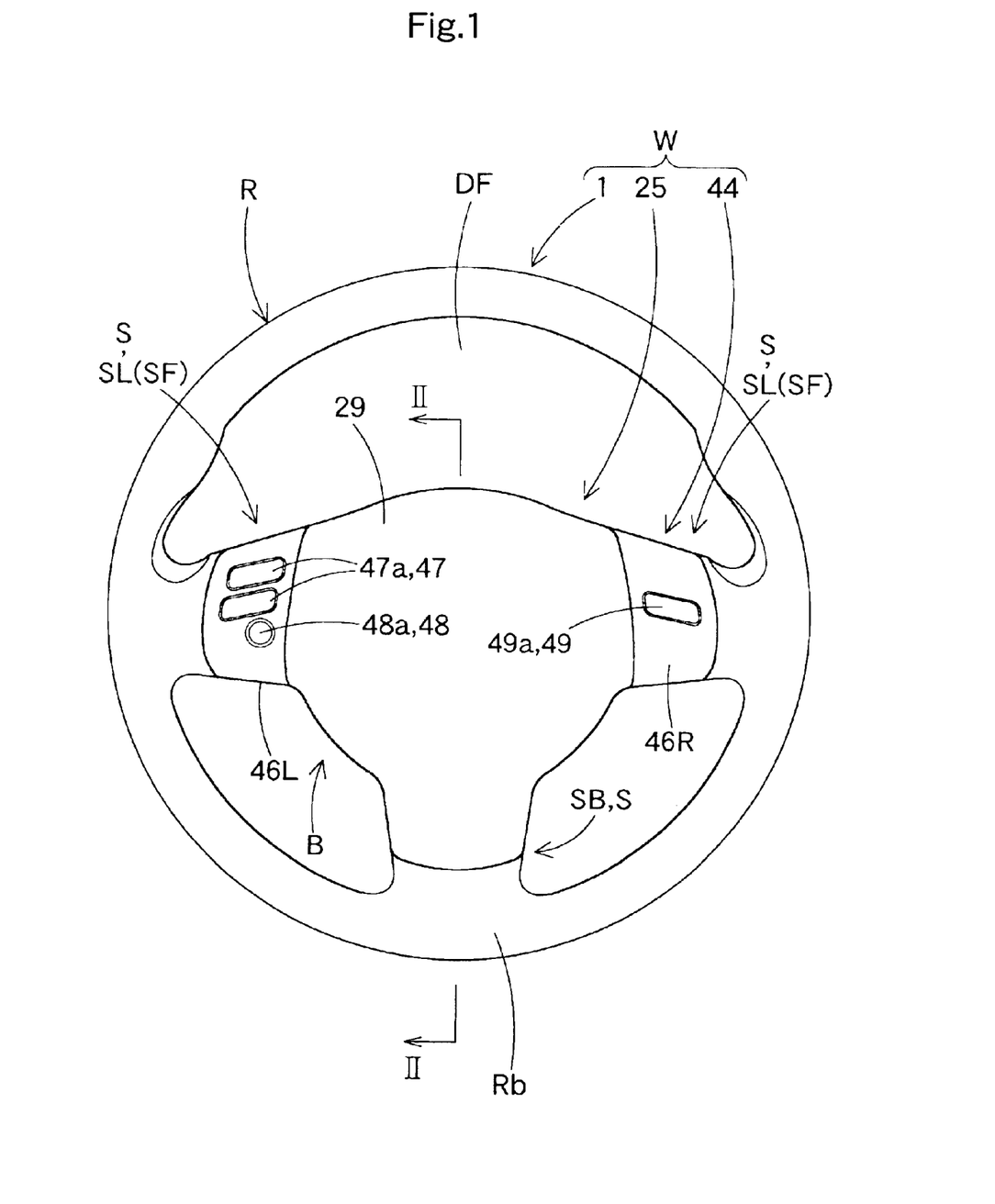
FIG. 1 is a plan view of an embodiment of a steering wheel according to the present invention.
Figure 2:
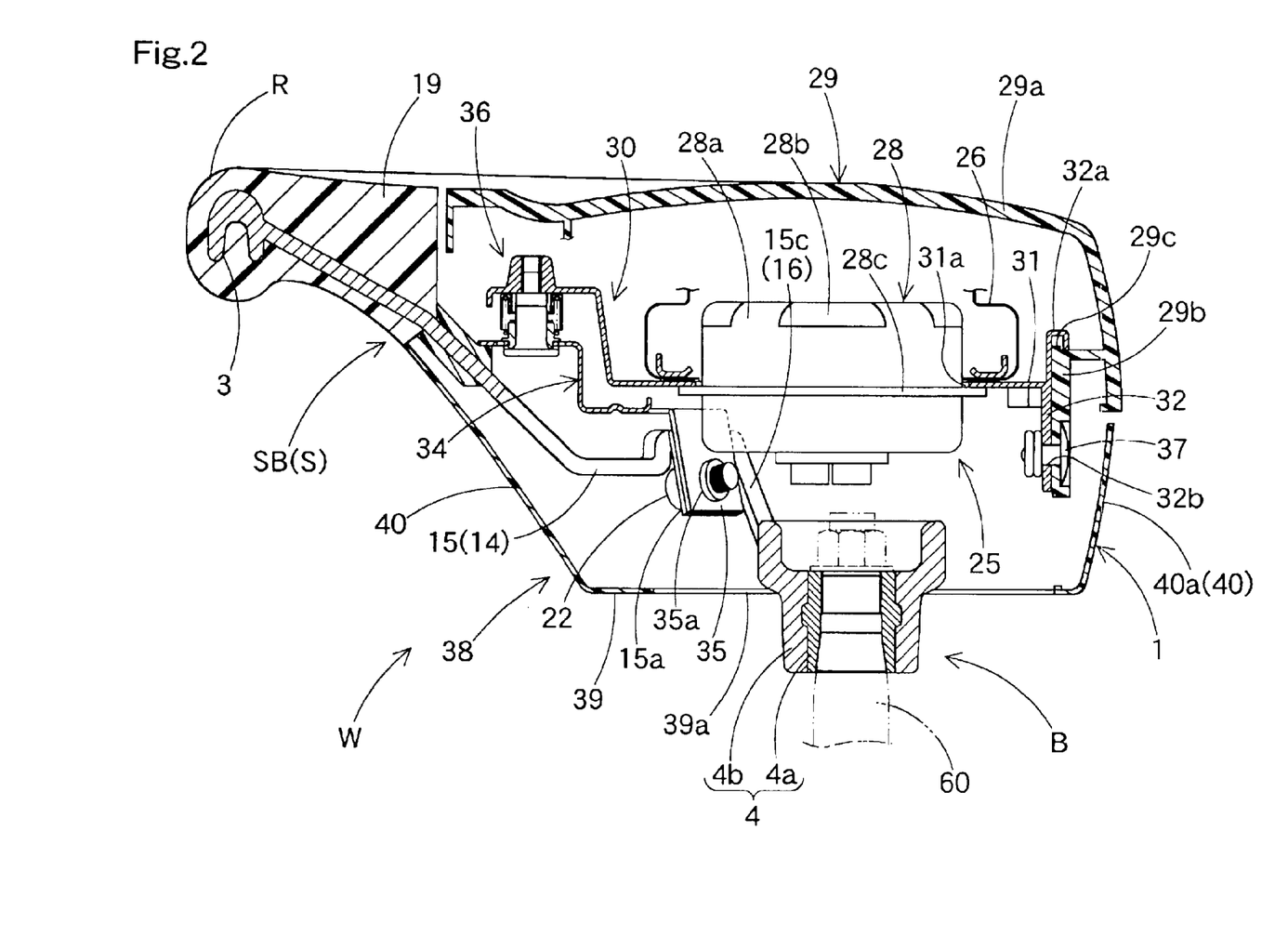
FIG. 2 is a schematic section of the steering wheel, taken along line II—II in FIG. 1.

Referring to FIGS. 1 and 2, a steering wheel W according to the present invention includes an annular ring portion R for holding in steering operation, a boss portion B located in the center of the ring portion R, and a spoke portion S connecting the ring portion R and the boss portion B. As shown in FIG. 1, the spoke portion S includes two front spokes SF (SL and SR) which neighbor a front space DF in the inner side of the ring portion R and are symmetrically arranged relative to the boss portion B, and one rear spoke SB arranged rearward of the front spokes SF. The steering wheel W includes, as components, a steering wheel body 1, an airbag device 25 which has a pad 29 and is disposed above the boss portion B, and a switch module 44.

The steering wheel body 1 includes a steering wheel core 2 and a lower cover 38. The steering wheel core 2 connects each of the ring portion R, the boss portion B and the spoke portion S. The lower cover 8 covers the lower side of the boss portion B.

Figure 3:
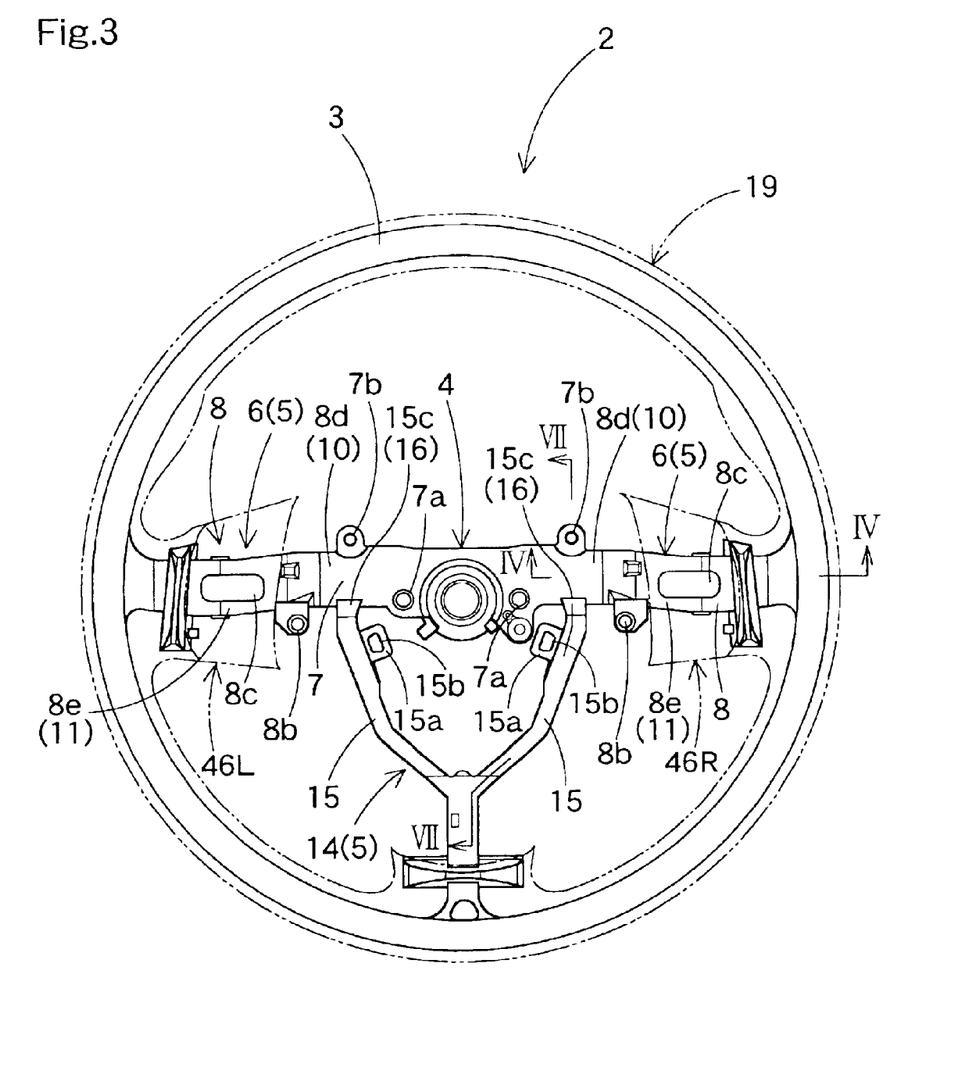
FIG. 3 is a plan view of a steering wheel core of FIG.1.
Figure 4:
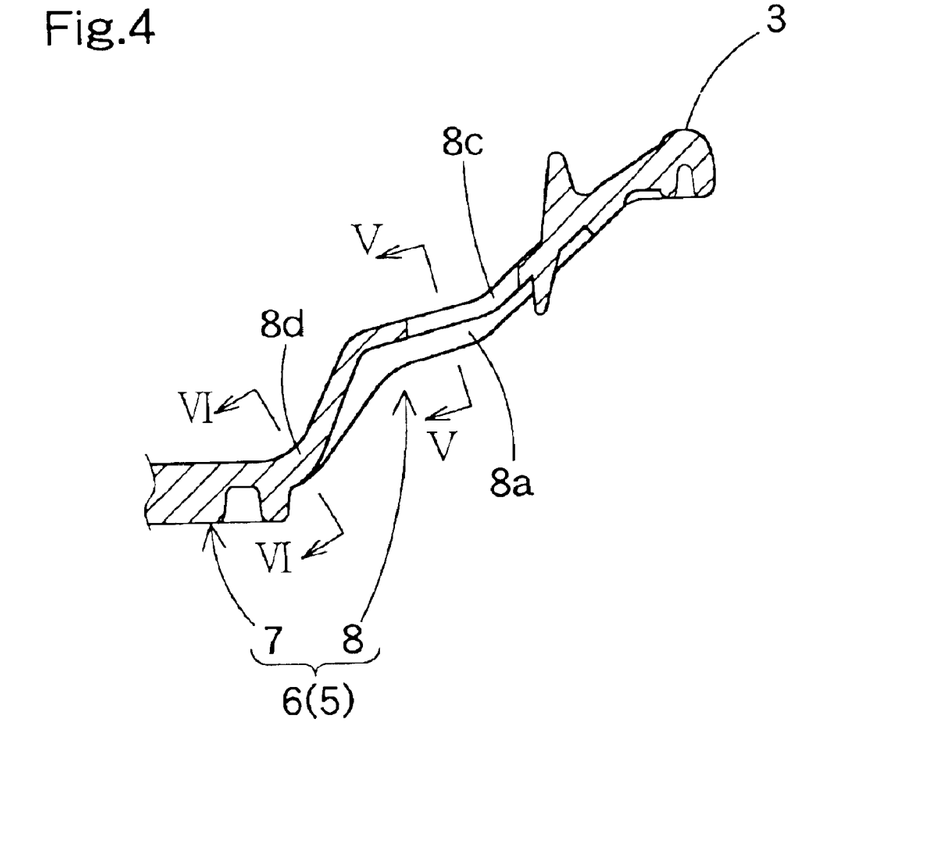
FIG. 4 is a sectional view taken along line IV—IV of FIG. 3.
Figure 16:
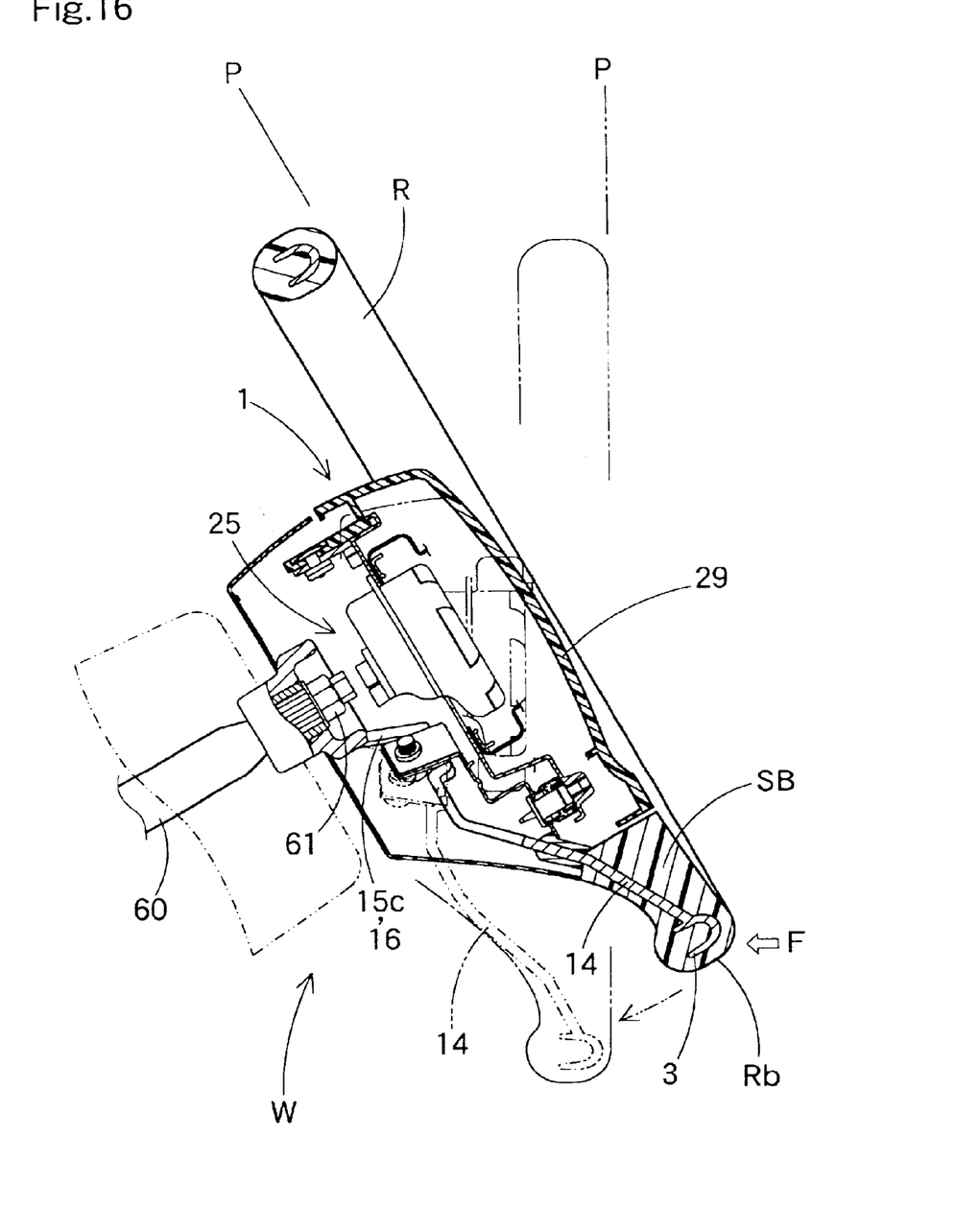
FIG. 16 is a schematic section illustrating the self-alignment of the steering wheel of FIG. 1.

Referring to FIGS. 3 and 4, the steering wheel core 2 includes a ring core 3, a boss core 4 and three spoke cores 5. The ring core 3 is located in the ring portion R and has a reversed U-shaped cross section. The boss core 4 is joined to a steering shaft 60 (refer to FIGS. 2 and 16). Each of the spoke cores 5 connects the boss core 4 and the ring core 3.

Referring to FIG. 2, the boss core 4 includes a boss 4a made of steel joined to the steering shaft 60 and a covering portion 4b made of aluminum alloy, magnesium alloy or the like. The covering portion 4b covers around the boss 4a cylindrically, and is integrally die cast molded with the ring core 3 and the spoke cores 5.

Each of the spoke cores 5 extends from the covering portion 4b of the boss core 4 diagonally upward toward the ring core 3. The three spoke cores 5 includes two front spoke cores 6 and 6 extending from the covering portion 4b to the left and right directions and joined to the ring core 3, and one rear spoke core 14 extending rearward from the covering portion 4b to be joined to the ring core 3.

Figure 5:
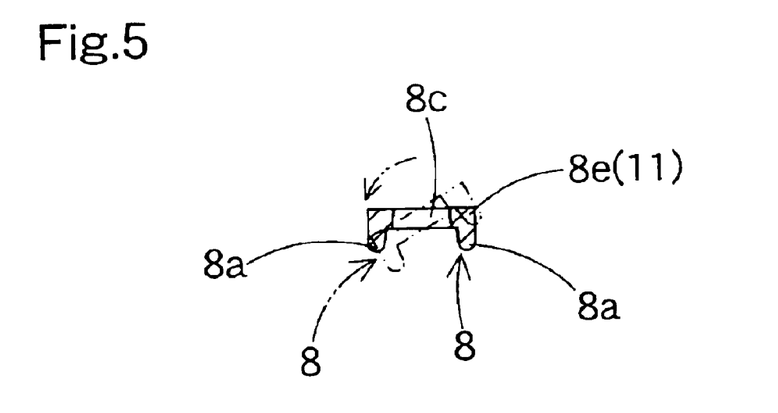
FIG. 5 is a sectional view taken along line V—V of FIG. 4.

Each of the front spoke cores 6 is plate-shaped, and includes a horizontal plate portion 7 toward the boss covering portion 4b, and a slant plate portion 8 extending obliquely upward from the horizontal plate portion 7 to the ring core 3, as shown in FIGS. 3 and 4. As shown in FIGS. 4 and 5, the slant plate portion 8 is provided at both ends in width direction with ribs 8a projected downward for stiffening. The ribs 8a are formed over the generally entire length of the slant plate portion 8. Moreover, each of the slant plate portions 8 is provided with a mounting hole 8b for inserting a screw 55 therethrough to fix later-described switch operation portions 46L and 46R of the switch module 44, and an elliptical aperture 8c for inserting a later-described retaining pin 52 of the switch operation portions 46L and 46R in. Each of the horizontal plate portion 7 is provided with a puller hole 7a to be used in detaching from the steering shaft 60, and a mounting hole 7b for screw-fixing of the lower cover 38.

Each of the slant plate portions 8 includes a first deformable portion 10 and a second deformable portion 11 both of which are twist-deformable upon self-alignment of the steering wheel W. Each of the first deformable portions 10 is located to the boss portion B relative to the switch operation portions 46L and 46R. More specifically, in the embodiment, parts 8b of the slant plate portions 8 in the vicinity of the horizontal plate portions 7 are formed in a plane plate shape without the ribs 8a and 8a. Stress concentration is likely to occur in these parts (refer to FIGS. 4 and 6). Accordingly, as indicated by the double-dotted lines in FIG. 6, these parts 8d are twist-deformed upon self-alignment as the first deformable portion 10.

The second deformable portions 11 are located to the ring portion R relative to the first deformable portions 10. More specifically, in the embodiment, parts 8e of the slant plate portions 8 provided with the apertures 8c constitute the second deformable portions 11, since stress is likely to concentrate on these parts. The second deformable portions 11 are twist-deformed upon self-alignment, as indicated by the double-dotted lines in FIG. 5.

Figure 7:
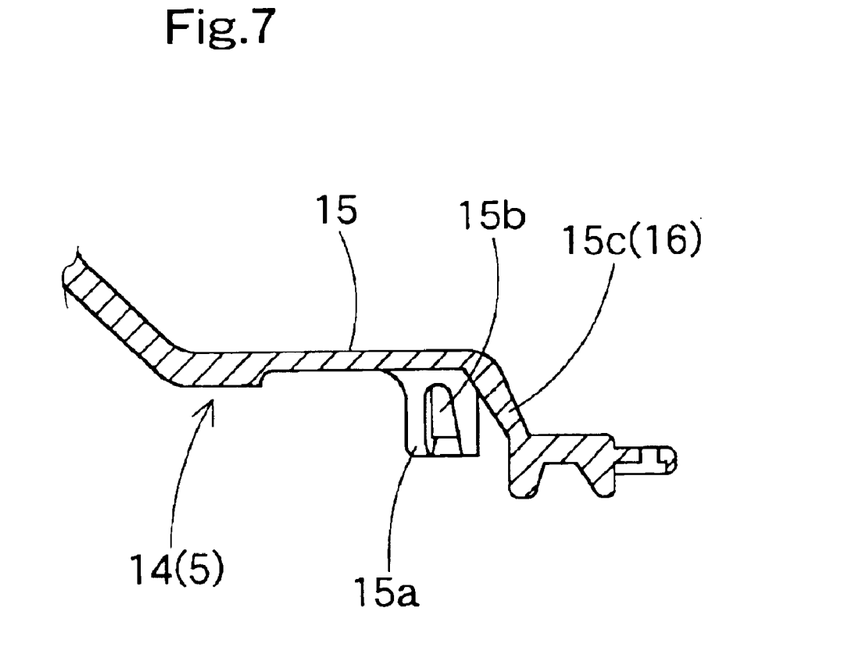
FIG. 7 is a sectional view taken along line VII—VII of FIG. 3.

Referring to FIG. 3, the rear spoke core 14 is bifurcated near the covering portion 4b, and is converged near the ring core 3 into a single piece. Two branched portions 15 and 15 are provided with mounting seat portions 15a with mounting holes 15b, respectively, for attachment of the airbag device 25. Each of the branched portions 15 is joined at the front end to the corresponding horizontal plate portion 7 of the front spoke core 6, and is provided at a position forward of the mounting seat portion 15a with a plastically deformable portion 16 to be plastically deformed upon self-alignment. As shown in FIG. 7, more specifically, the front end 15c of each of the branched portions 15 is formed to rise acutely from the horizontal plate portion 7, and therefore, is likely to cause stress concentration. The front end 15c of each of the branched portions 15 constitutes a plastically deformable portion 16 to be bent upon self-alignment in a manner to turn the rear spoke core 14 downward.

Figure 8:
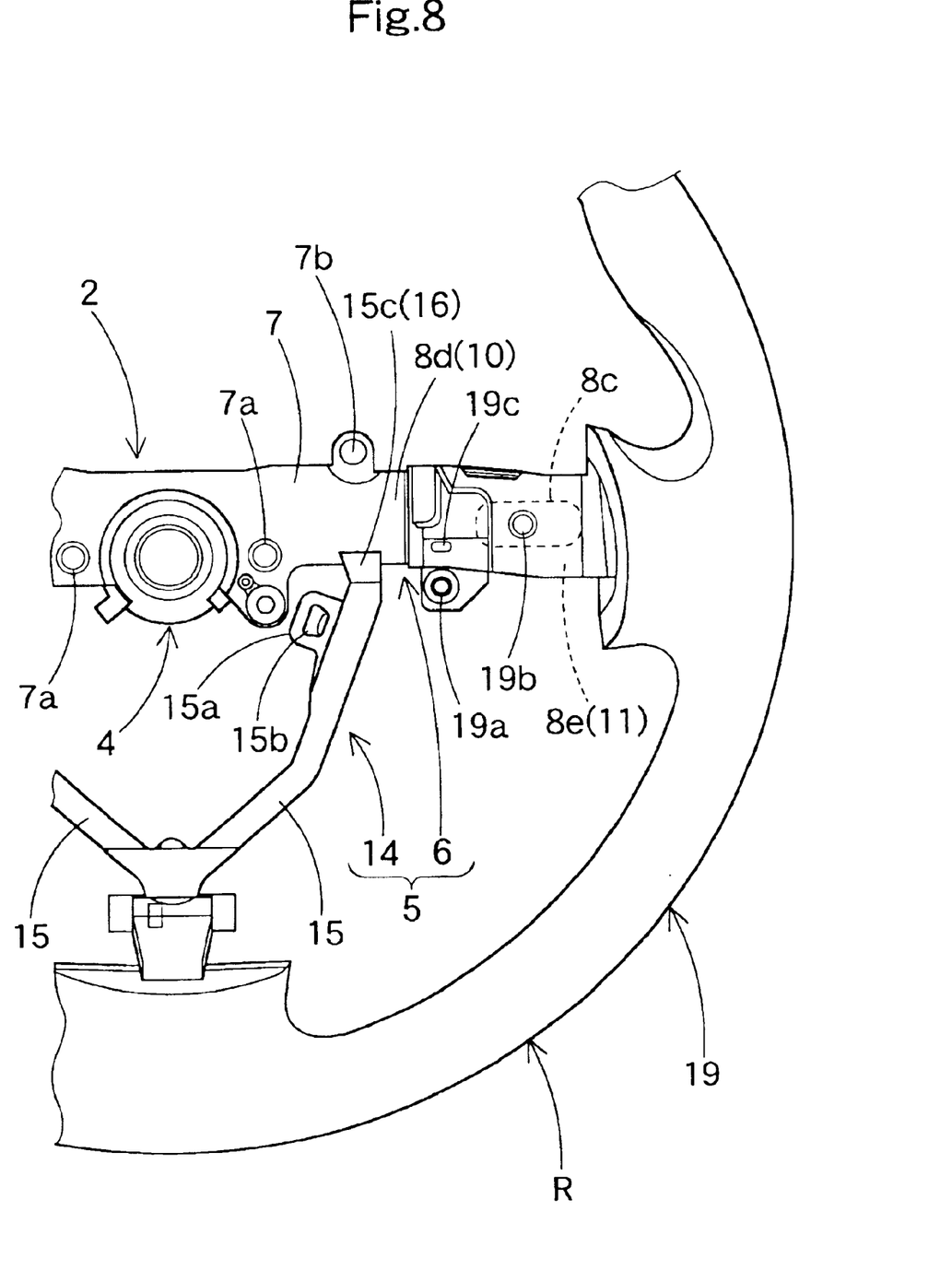
FIG. 8 is a schematic enlarged partial plan view of the steering wheel of FIG. 1 with a covering layer applied over the steering wheel core.

The covering layer 19 is made of synthetic resin, and covers the ring core 3, and parts of each of the spoke cores 5 near the ring core 3 (in the embodiment, the arrangement positions of the switch operation portions 46L and 46R (refer to FIGS. 8, 10, and 11)). The arrangement positions of the switch operation portions 46L and 46R in the covering layer 19 are provided with mounting holes 19a communicated with the mounting holes 8b for inserting the screws 55 therethrough to fix the switch operation portions 46L and 46R, and insert holes 19b formed in the positions of the apertures 8c for inserting the retaining pins 52 of the switch operation portions 46L and 46R in, respectively. In the vicinity of each of the mounting holes 19a, there is formed a fitting hole 19c for fitting in a projection 51b formed in a later-described mounting portion 51 of the switch operation portions 46L and 46R on the side of the covering layer 19 (or the back side).

Referring to FIG. 2, the airbag device 25 includes: a bag-shaped airbag 26 folded in an expandable manner; an inflator 28 for supplying inflation gas to the airbag 26; a pad 29 for covering the folded airbag 26; a bag holder 30 for holding the airbag 26, the inflator 28 and the pad 29; a horn switch mechanism 36; and a support plate 34 for attaching the airbag device 25 to the steering wheel body 1 and supporting the airbag device 25 there at.

The inflator 28 includes a body 28a and a flange 28c. The body 28a is substantially columnar in shape, and is provided at its upper side with a plurality of gas-discharge ports 28b. The flange 28c is projected from the outer circumferential side of the body 28a.

The pad 29 is made of synthetic resin, and includes a ceiling wall 29a and a side wall portion 29b. The ceiling wall 29a ruptures at predetermined positions upon inflation of the airbag 26. The side wall portion 29b has generally hexagonal cylindrical shape, and extends downward from the vicinity of the outer peripheral edge of the ceiling wall 29a. The side wall portion 29b is provided at predetermined positions in the inner circumference with a plurality of retaining portions 29c for retaining later-described retaining pawls 32a formed in a side wall portion 32 of the bag holder 30.

The airbag 26 and the inflator 28 are held by the bag holder 30 as follows: an annular retainer 27 placed within the airbag 26 includes a plurality of bolts (not shown) projected downward, and these bolts are inserted through the airbag 26, the bag holder 30, and the flange 28c of the inflator 28, and then nut-fastened. The pad 29 is held by the bag holder 30 by means of rivets 37 of the pad side wall portion 29b and the retention of the retaining pawls 32a to the retaining portions 29c.

The bag holder 30 includes a bottom wall 31 and a side wall portion 32. The bottom wall 31 is provided at the center with an insert hole 31a for inserting in the inflator body 28a from the lower side. The side wall portion 32 extends upward from the outer peripheral edge of the bottom wall 31, and is provided at predetermined positions with the retaining pawls 32a to be retained by the retaining portions 29c of the pad side wall portion 29b, and the mounting holes 32b for fixing the pad side wall portion 29b by the rivets 37 (refer to FIG. 2).

The support plate 34 shown in FIG. 2 is made of plate metal, and is provided at two predetermined positions with joint pieces 35 for joining the airbag device 25 to the steering wheel core 2. Each of the joint pieces 35 is formed to correspond to each of the mounting seat portions 15a of the rear spoke core 14. Each of the joint pieces 35 includes a nut 35a fixed thereto, and a not-shown joint hole for securing the airbag device 25 to each of the mounting seat portions 15a of the rear spoke core 14 by means of bolts 22.

Figure 12:
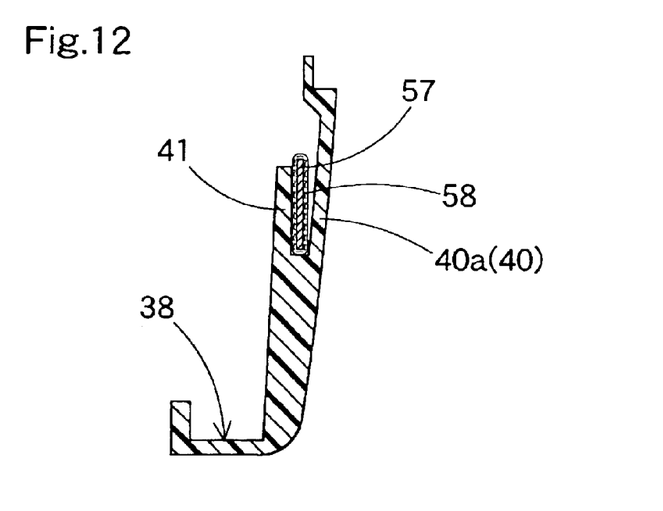
FIG. 12 is a sectional view taken along line XII—XII of FIG. 9.

The lower cover 38 includes a bottom wall 39 which is provided at the center with an insert hole 39a for inserting the boss core 4, and a side wall portion 40 extending upward from the outer peripheral edge of the bottom wall 39. The front side wall 40a is provided at two predetermined positions with clips 41 to hold a later-described harness 57 of the switch module 44. As shown in FIG. 12, these clips 41 are configured to project upward from the vicinity of the lower end of the front side wall 40a, and hold the harness 57 inserted into a gap formed between the front side wall 40a from upper side. In the embodiment, the clips 41 are located at two left and right positions apart from the center of the front side wall 40a, as shown in FIG. 9.

The switch module 44 includes the switch operation portions 46L and 46R located in the left and right, and a harness 57 connecting the switch operation portions 46L and 46R.

Figure 9:
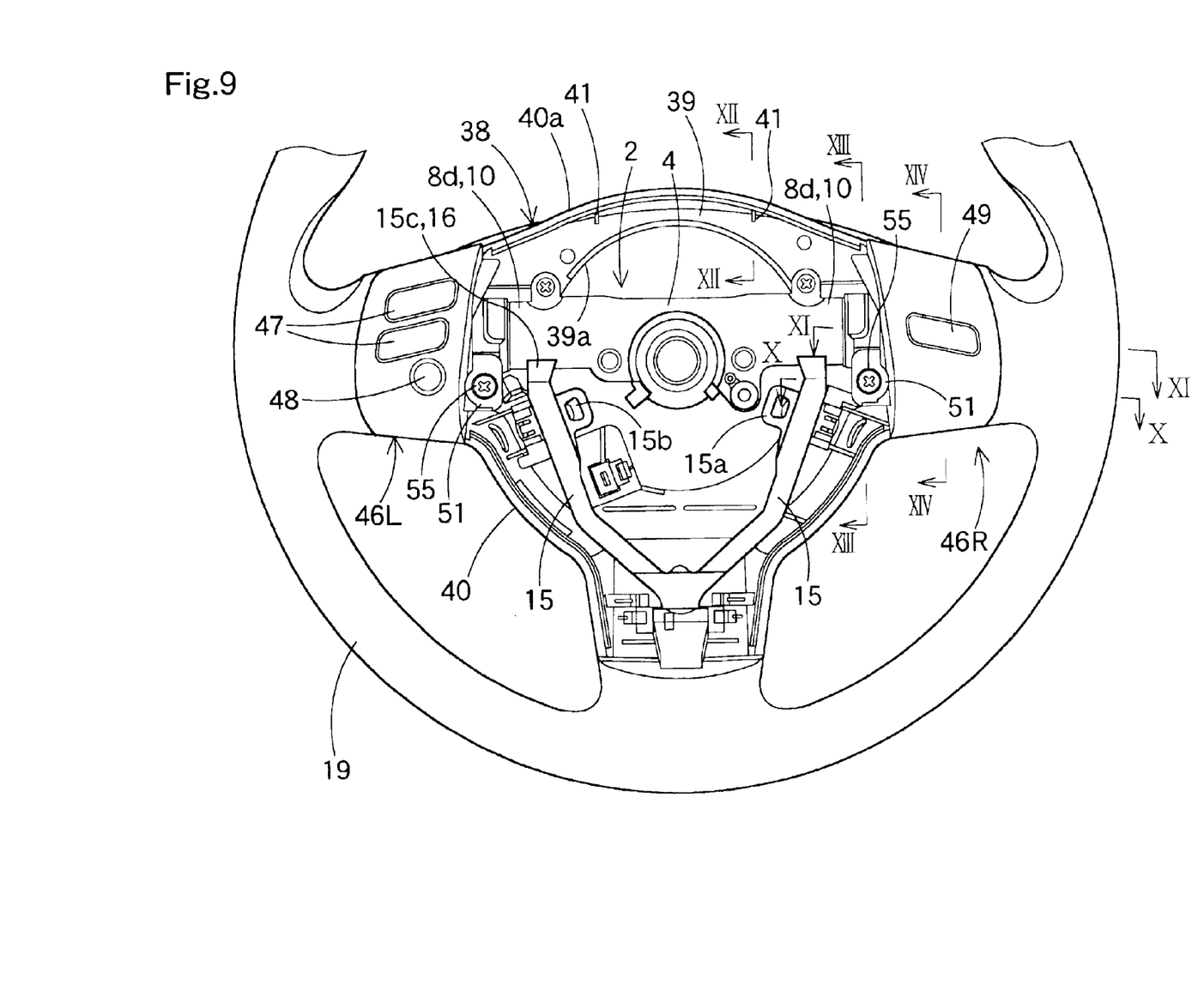
FIG. 9 is a plan view of the steering wheel of FIG.1 in which a switch module and a lower cover are attached to the steering wheel core covered by the covering layer.

Referring to FIGS. 1 and 9, the individual switch operation portions 46L and 46R are located on the upper side of the individual front spokes SL and SR and near the ring portion R. In the embodiment, there are arranged operation buttons 47 and switch button 48 of audio equipment, navigation system, and so on, in the left switch operation portion 46L. There is arranged an operation button 49 of blind corner monitor in the right switch operation portion 46R. The operation surfaces 47a, 48a and 49a on the upper side of these switch operation portions 46L and 46R are located proximate to the ring plane P so as to be operated easily from upper side in steering of the steering wheel W.

Figure 10:
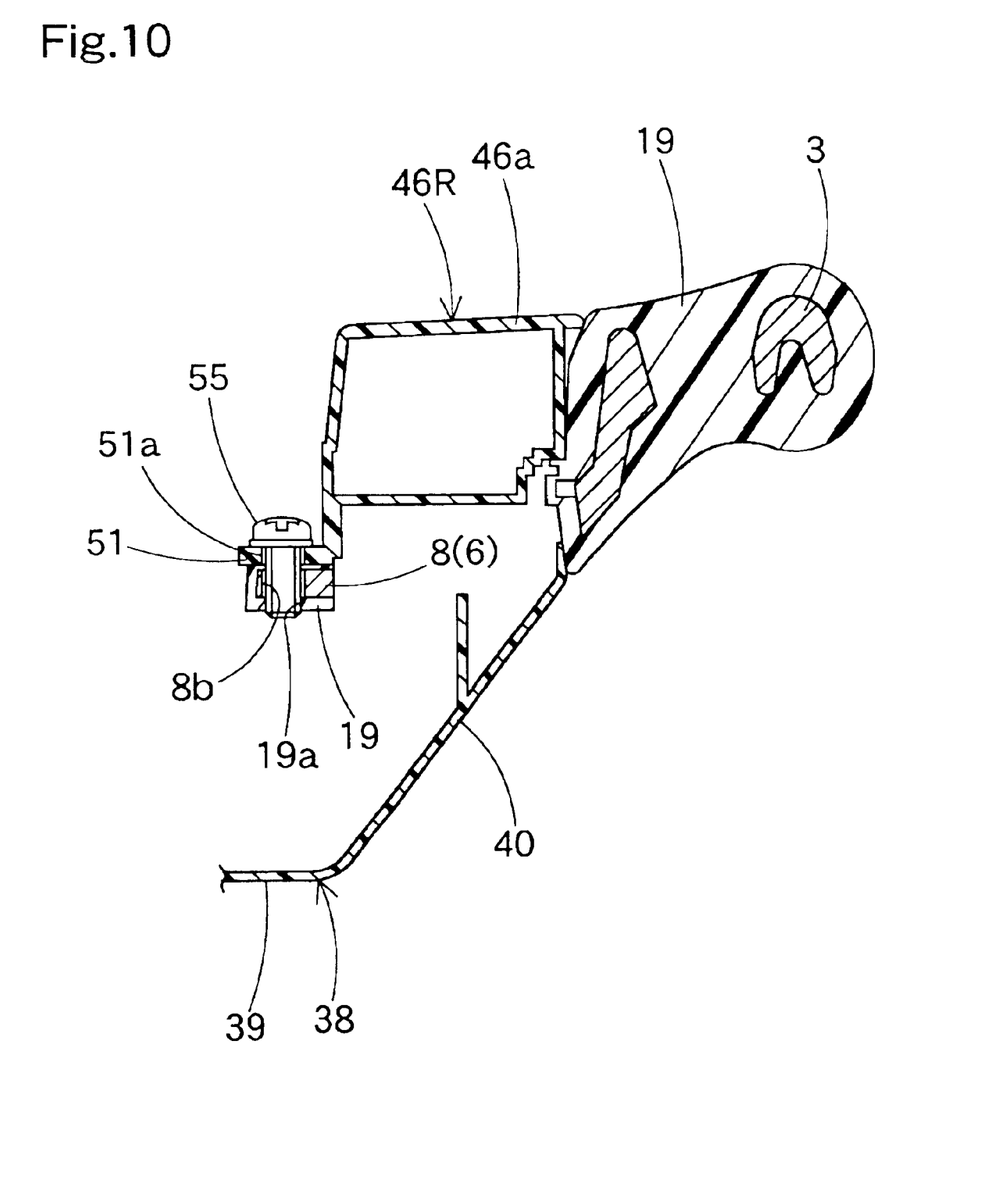
FIG. 10 is a sectional view taken along line X—X of FIG. 9.
Figure 11:
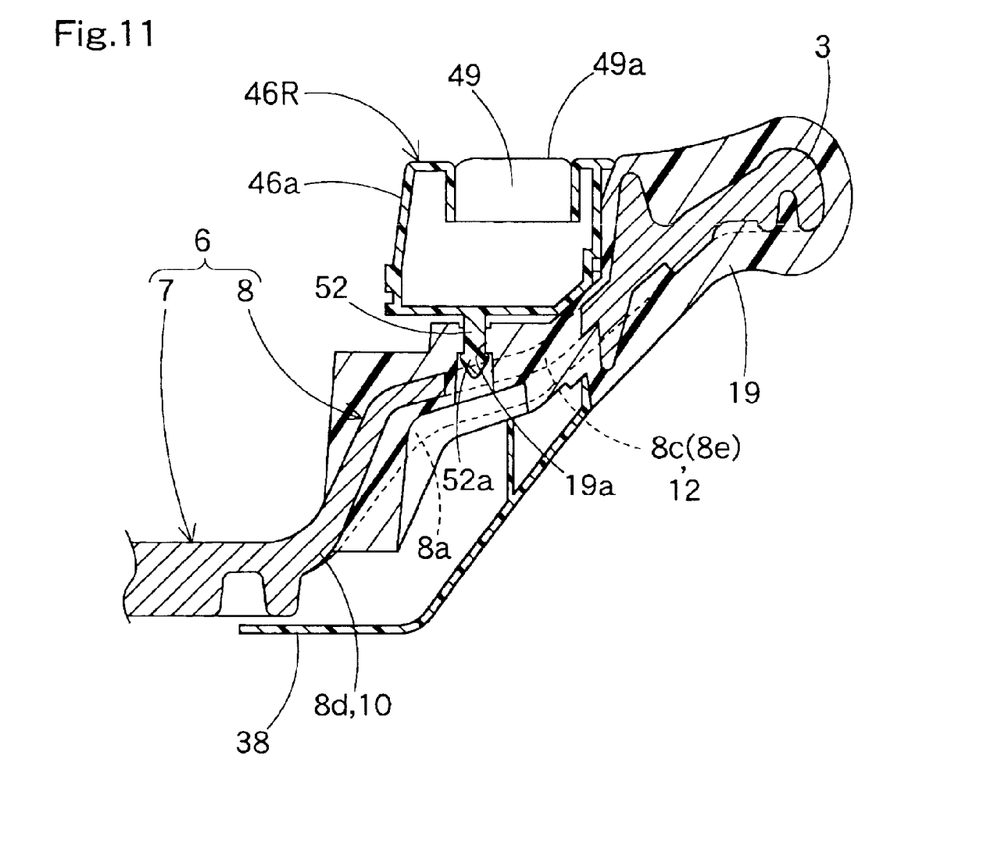
FIG. 11 is a sectional view taken along line XI—XI of FIG. 9.
Figure 13:
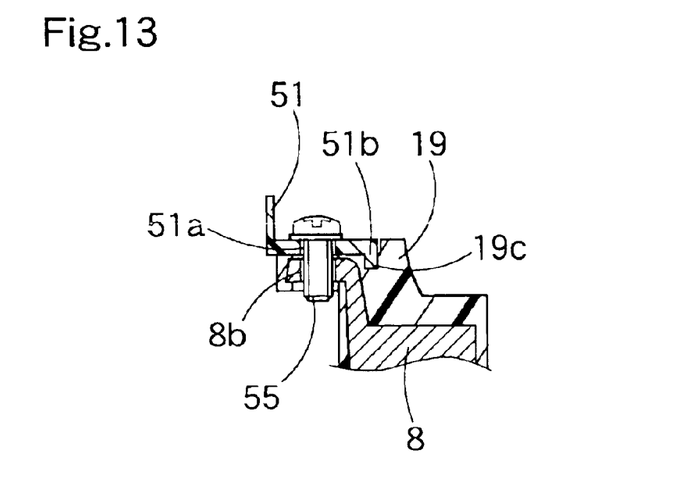
FIG. 13 is a sectional view taken along line XIII—XIII of FIG. 9.
Figure 15:
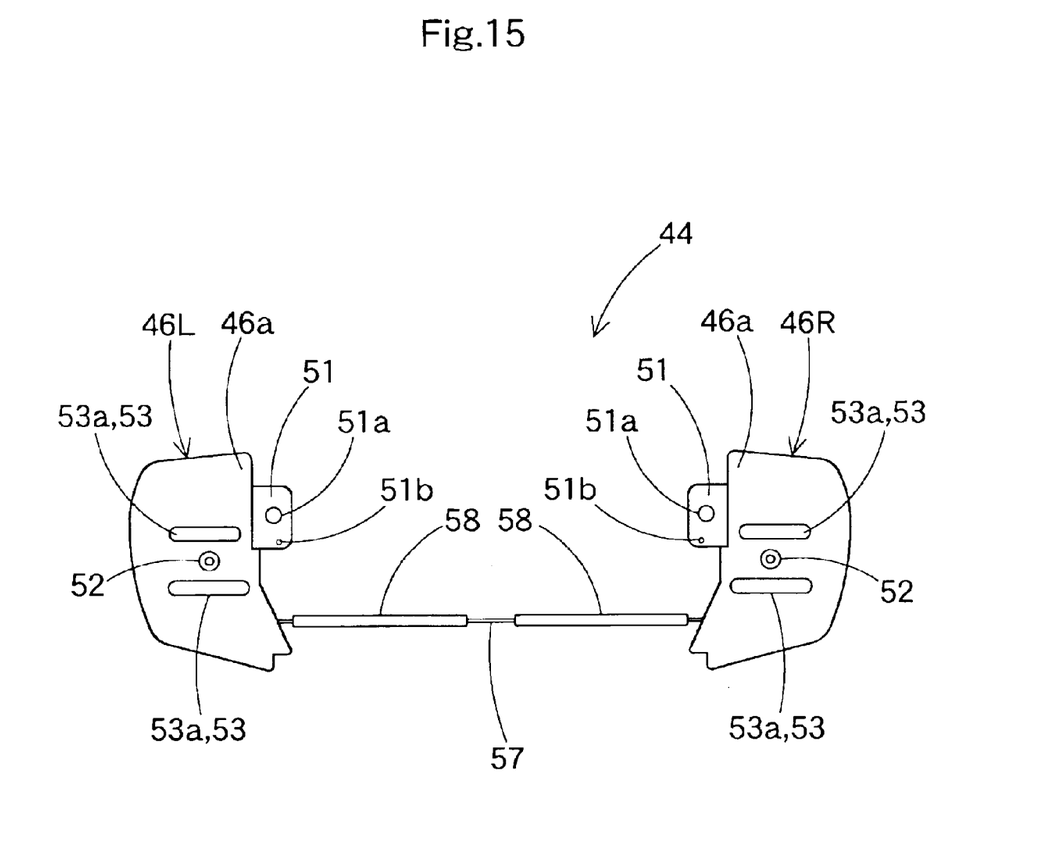
FIG. 15 is a bottom view of a switch module for the steering wheel of FIG. 1.

The individual switch operation portions 46L and 46R are secured to the front spoke cores 6 of the steering wheel core 2 by means of mounting portions 51 formed toward the boss B. As shown in FIGS. 10 and 15, each of the mounting portions 51 is formed in a rear side position stepped down from the lower surface of the main body 46a of the switch operation portions 46L and 46R, so as to be located below the lower surface of the main body 46a of the switch operation portions 46L and 46R. Each of the mounting portions 51 is provided at the center with a through hole 51a for inserting the screw 55 there into. In the front edge of each of the mounting portions 51, there is formed a projection 51b projected toward the covering layer 19 or downward, as shown in FIGS. 13 and 15. This projection 51b is to be fitted into the fitting hole 19c formed in the covering layer 19, to help position the individual switch operation portions 46L and 46R in securing the switch operation portions 46L and 46R to the front spoke cores 6 of the steering wheel core 2 by means of the screws 55.

The switch operation portions 46L and 46R (or the main body 46a) are individually provided at the center with a retaining pin 52 projected downward. This retaining pin 52 is to be inserted into the insert hole 19b of the covering layer 19 near the second deformable portion 11 in the front spoke 6. In order not to come off easily from the insert hole 19b, the retaining pin 52 is provided at the leading end with a bulged portion 52a bulging outwardly, over the entire circumference. This retaining pin 52 is adapted to keep the individual switch operation portions 46L and 46R retained to the steering wheel core 2 by means of the bulged portion 52a retained at the peripheral edge of the insert hole 19b. The retaining pin 52 also helps position the individual switch operation portions 46L and 46R in securing the switch operation portions 46L and 46R to the front spoke cores 6 with the screws 55 together with the projection 51b formed in the mounting portion 51.

Figure 14:
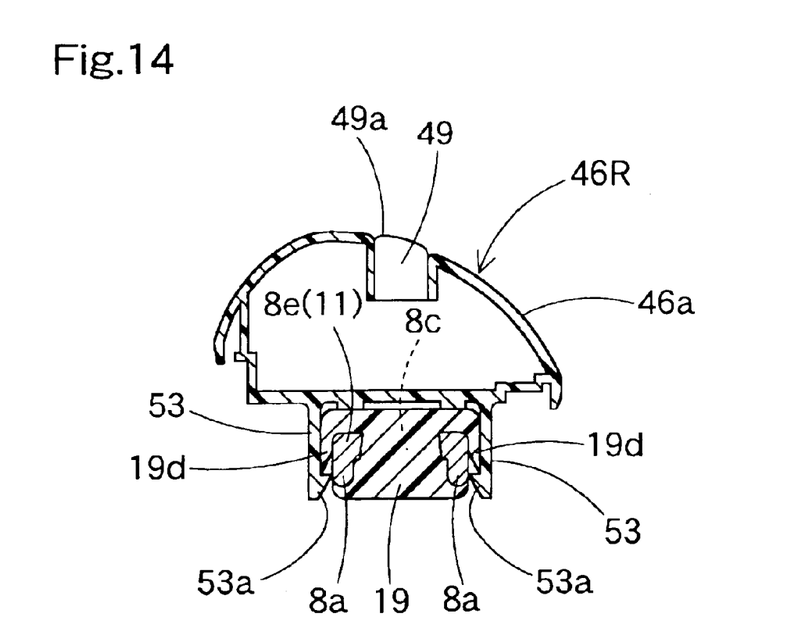
FIG. 14 is a sectional view taken along line XIV—XIV of FIG. 9.

In the front and rear side of the retaining pin 52 of the individual switch operation portions 46L and 46R (or the main body 46a), there are formed retaining legs 53 and 53 along the transverse direction, as shown in FIG. 15. These retaining legs 53 and 53 are adapted to clamp the covering layer 19 from the front and rear sides in the arrangement position of the aperture 8c of the slant plate portion 8 (or the position of the second deformable portion 11), as shown in FIG. 14. The individual retaining legs 53 are provided in the vicinity of their leading ends with a pawl 53 projected toward the covering layer 19. By having the pawl 53a caught by a stepped portion 19d formed in the covering layer 19, each of the retaining legs 53 is held by the covering layer 19 so as not to come off upward.

To summarize, in the embodiment, the individual switch operation portions 46L and 46R are secured to the steering wheel core 2 by means of the screws 55 of the mounting portions 51, the retaining pins 52 and the retaining legs 53 of the switch operation portions 46L and 46R. The individual switch operation portions 46L and 46R are fixed at the side of the boss B by the screws 55, and so fixed at the side of the ring portion R as not to move longitudinally or vertically by the retaining pins 52 and the retaining legs 53. The retaining pins 52 and the retaining legs 53 are held by the covering layer 19 by means of the bulged portions 52a and the pawls 53a, and this engagement is not so strong as screw-fixing. Accordingly, when the second deformable portion 11 of the front spoke core 6 is deformed by twisting, the retaining pins 52 and the retaining legs 53 are easily released from the engagement with the cover layer 19. More specifically, when the insert hole 19b of the covering layer 19 located in the vicinity of the second deformable portion 11 is deformed along with the twist-deformation of the second deformable portion 11, the bulged portion 52a of the retaining pin 52 is released from the engagement with the peripheral edge of the insert hole 19b. In the individual retaining legs 53 and 53, the pawls 53a are released from the engagement with the stepped portions 19d of the covering layer 19 located in the vicinity of the second deformable portion 11, along with the twist-deformation of the second deformable portion 11. Consequently, even if the retaining pins 52 and the retaining legs 53 and 53 are formed in the vicinity of the second deformable portions 11, the retaining pins 52 and the retaining legs 53 and 53 are easily released from the engaged condition, so that the switch operation portions 46L and 46R are smoothly displaced without damage along with the displacement of the ring plane P.

The harness 57 is made of flexible material. When the switch module 44 is mounted on the steering wheel W, the harness 57 is held by the clips 41 formed in the front side wall 40a of the lower cover 38, as shown in FIG. 12. The harness 57 is wrapped around by a cover 58 of felt or the like at the positions held by the clips 41. This cover 58 is adapted to prevent noises caused by the friction of the harness 57 and the peripheral edge of the clips 41, and also function as a spacer for preventing the harness 57 from coming out of the gap between the clips 41 and the front side wall 40a.

The mounting of the steering wheel W of the foregoing embodiment on a vehicle is now described. Firstly, the airbag device 25 is assembled.

Subsequently, the lower cover 38 is attached to the steering wheel core 2 which is provided with the die cast covering layer 19, by means of screws or the like. Thereafter, the retaining legs 53 and 53 of the switch operation portions 46L and 46R in the switch module 44 are set to clamp the front spoke cores 6, while the retaining pins 52 are inserted into the insert holes 19b of the covering layer 19. At this time, the projections 51b formed in the mounting portions 51 of the switch operation portions 46L and 46R are fitted into the fitting holes 19c of the covering layer 19. Then the screws 55 are inserted into the mounting holes 51a of the mounting portions 51 and the mounting holes 19a of the covering layer 19 to attach the switch module 44 to the steering wheel core 2. The harness 57 is hooked by the clips 41 formed in the front side wall 40a of the lower cover 38. Thereafter, the steering wheel body 1 thus assembled is secured to the steering shaft 60 covered by the boss 4a of the boss core 4 by a nut 61 (refer to FIG. 16). Here, the steering shaft 60 is slanted from the horizontal direction by about 30° with its upper end directed upward.

Then a not-shown lead wire of the horn switch mechanism 36 extending from the airbag device 25 is connected to a not-shown connector toward the steering wheel body 1. The joint pieces 35 of the support plate 34 in the airbag device 25 assembled in advance are located to abut the inner sides of the mounting seat portions 15a of the branched portions 15 of the rear spoke core 14, and the mounting bolts 22 are fastened into the not-shown joint holes of the joint pieces 35 through not-shown insert holes in the lower cover 38. Thus the steering wheel W is assembled and mounted on the steering shaft 60.

In the steering wheel W thus assembled, predetermined apparatuses are actuated by pressing down the operation surfaces 47a, 48a and 49a of the individual switch operation portions 46L and 46R (or the operation buttons 47, 49 and the switch button 48).

Upon actuation of the inflator 28, inflation gas from the inflator 28 flows into the airbag 26, and the airbag 26 pushes open the ceiling wall 29a of the pad 29 to inflate largely.

Figure 6:
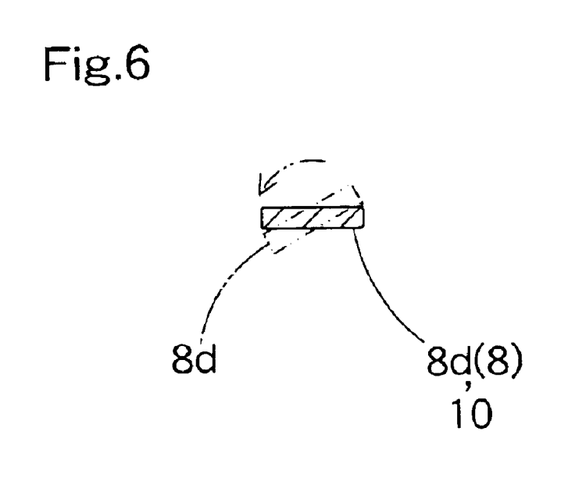
FIG. 6 is a sectional view taken along line VI—VI of FIG. 4.

In the steering wheel W of the foregoing embodiment, the first and second deformable portions 10 and 11 located in the slant plate portion 8 of the front spoke cores 6 are plastically twist-deformed as indicated by the double-dotted lines in FIGS. 5 and 6 upon self-alignment. At this time, impact F forward and along the generally horizontal direction is applied to the rear portion Rb of the ring portion R shown in FIG. 16. In the steering wheel W of the embodiment, although the front spokes SF (SL and SR) are provided with the switch operation portions 46L and 46R, the first deformable portions 10 are located to the boss portion B relative to the switch operation portions 46L and 46R. Accordingly, even if the first deformable portions 10 are twist-deformed upon self-alignment, the switch operation portions 46L and 46R are displaced along with the displacement of the ring plane P, since the switch operation portions 46L and 46R are located toward the ring portion R.

In the steering wheel W of the foregoing embodiment, therefore, the switch operation portions 46L and 46R located in the front spokes SF are able to follow the displacement of the ring plane P easily upon self-alignment. Moreover, the switch operation portions 46L and 46R are prevented to the utmost from unnecessarily protruding from the ring plane P, and applying partial pressure to the driver hitting the ring plane P.

In the steering wheel W of the foregoing embodiment, moreover, the front spoke cores 6 are provided toward the ring portion R relative to the first deformable portions 10 with the second deformable portions 11 twist-deformable upon self-alignment, so that the displacement of the ring plane P is promoted. By the second deformable portions 11, furthermore, flexural strength of the first deformable portions 10 is improved while retaining the easiness of the displacement of the ring plane P. Accordingly, deflection of the ring portion R is suppressed. Consequently, natural frequency of the steering wheel W itself is prevented from falling, thereby preventing chattering. Without considering this point, the front spoke cores do not have to be provided with a second deformable portion.

In the steering wheel W of the foregoing embodiment, moreover, each of the switch operation portions 46L and 46R is screw 55 fixed to the slant plate portion 8 of the front spoke core 6 at only one position. Accordingly, since the switch operation portions 46L and 46R are not tightly secured at a plurality of positions, the switch operation portions 46L and 46R are smoothly displaced without damage upon self-alignment along with the displacement of the ring plane P. Here, if the switch operation portions 46L and 46R are screw-fixed at a plurality of positions, the distances between the fixing points change along with the twist-deformation of the front spoke cores 6, which is likely to damage the switch operation portions 46L and 46R.

To summarize, in the steering wheel W of the embodiment, the individual switch operation portions 46L and 46R are secured to the steering wheel core 2 by means of the retaining pins 52 and the retaining legs 53 of the switch operation portions 46L and 46R, other than the screws 55. However, the retaining pins 52 and the retaining legs 53 do not so strongly fix the switch operation portions 46L and 46R to the steering wheel core 2 as by screw-fixing. Accordingly, along with the twist-deformation of the second deformable portion 11, the retaining pins 52 and the retaining legs 53 are easily released from the engagement with the covering layer 19 (or the steering wheel core 2). As a result, the switch operation portions 46L and 46R are stably fixed by the steering wheel core 2 when the steering wheel W is mounted on the vehicle, and upon self-alignment, are smoothly displaced without damage along with the displacement of the ring plane P. Without considering this point, the individual switch operation portions 46L and 46R may be tightly secured to the steering wheel core 2 at a plurality of positions.

Furthermore, in the steering wheel W of the embodiment, the pad 29 located over the boss portion B is joined to the rear spoke core 14, and the rear spoke core 14 is provided at a position forward of the mounting seat portion 15a, or at the joint position with the pad 29, with the plastically deformable portion 16 deformable upon self-alignment. Upon self-alignment, the pad 29 is displaced along with the plastic deformation of the rear spoke core 14. Consequently, as indicated by the double-dotted lines in FIG. 16, the top surface of the pad 29 is displaced following the ring plane P, while prevented to the utmost from protruding from the ring plane P. Without considering this point, the plastically deformable portion 16 may be located in a rearward position of the mounting seat portion 15a in the branched portion 15 of the rear spoke core 14. Alternatively, the rear spoke core 14 may be formed without a plastically deformable portion 16.

Although the foregoing embodiment has taken a steering wheel W with three spokes S as an example, the number of spokes S is not limited thereby, but the present invention may be applied to a steering wheel with four spokes.

Moreover, in the steering wheel W of the foregoing embodiment, the two switch operation portions 46L and 46R are located in the front spokes SL and SR. However, the steering wheel may be provided at only one of the front spokes with a switch operation portion. Even when the steering wheel is thus configured, a deformable portion is desirably provided on the other front spoke without a switch operation portion, too, at a position generally symmetric relative to the boss portion.

What is claimed is:

1. A steering wheel comprising:

a steering wheel body that comprises a steering wheel core including a ring core of a ring portion, a boss core of a boss portion, and a plurality of spoke cores of spokes, wherein the ring portion is held during steering, the boss portion is located in the center of the ring portion, and the spokes connect the ring portion and the boss portion;

a pad located above the boss portion, wherein the pad is joined to the steering wheel core; and a switch operation portion; wherein the switch operation portion is separated from the pad and is arranged outward from the pad toward the ring, wherein:

upon self-alignment of the steering wheel, a ring plane of the steering wheel body is displaced toward the vertical plane due to plastic deformation of the steering wheel core;

the switch operation portion is disposed in at least one of two spokes located in the front side, the two front spokes neighboring a front space inside the ring portion and being arranged generally symmetrically relative to the boss portion; and the cores of the front spokes comprise deforming portions, respectively, at positions generally symmetric relative to the boss portion and toward the boss portion relative to the switch operation portion, whereby the front spoke cores twist-deform upon self-alignment.

2. The steering wheel according to claim 1, wherein the deforming portions are first deforming portions, and wherein each of the front spoke cores further comprises, at a position toward the ring portion relative to a corresponding one of the first deforming portions, a second deforming portion which twist deforms upon self-alignment.

3. The steering wheel according to claim 1, wherein the switch operation portion is screw-fixed to the front spoke core at only one position.

4. The steering wheel according to claim 1, wherein:

the pad is joined to a core of a rear spoke and held thereat, the rear spoke being located rearward of the front spokes; and the rear spoke core comprises a plastically deforming portion at a position forward of the joint with the pad, wherein the plastically deforming portion deforms plastically upon self-alignment.

* * * * *